(12) United States Patent
Koyama (10) Patent No.: US 7,624,200 B2
(45) Date of Patent: Nov. 24, 2009

(54) DATA OUTPUT APPARATUS THAT LOCKS AND UNLOCKS DATA FORMAT

(75) Inventor: Shinichi Koyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 222 days.

(21) Appl. No.: 11/060,280

(22) Filed: Feb. 18, 2005

(65) Prior Publication Data

US 2005/0188124 A1    Aug. 25, 2005

(30) Foreign Application Priority Data

Feb. 25, 2004    (JP) .............................. 2004-050057

(51) Int. Cl.
G06F 3/00    (2006.01)
H04N 7/18    (2006.01)
(52) U.S. Cl. ............................................ 710/5; 725/80
(58) Field of Classification Search .................... 710/5; 725/80
See application file for complete search history.

(56) References Cited

U.S. PATENT DOCUMENTS

| | | | | |
|---|---|---|---|---|
| 5,262,860 | A * | 11/1993 | Fitzpatrick et al. | 348/461 |
| 5,448,306 | A | 9/1995 | Koyama | 348/678 |
| 5,774,192 | A | 6/1998 | Koyama | 348/715 |
| 5,845,147 | A * | 12/1998 | Vishlitzky et al. | 710/5 |
| 6,747,590 | B1 * | 6/2004 | Weber | 341/176 |
| 7,032,059 | B1 | 4/2006 | Yamada et al. | 710/313 |
| 2001/0002846 | A1 * | 6/2001 | Onishi | 348/231 |
| 2001/0018768 | A1 * | 8/2001 | Horiguchi et al. | 725/80 |
| 2002/0102095 | A1 | 8/2002 | Koyama | 386/96 |
| 2003/0202216 | A1 | 10/2003 | Nakama et al. | 358/302 |

FOREIGN PATENT DOCUMENTS

| | | |
|---|---|---|
| CN | 1274230 | 11/2000 |
| EP | 1 052 574 A2 | 11/2000 |
| JP | 2001-275076 | 10/2001 |

(Continued)

OTHER PUBLICATIONS

Samuel Reynolds, 'Working with Threads—Semaphores—Traffic Control for Threads', Nov. 17, 1998, ScriptMeridian.*

(Continued)

Primary Examiner—Henry W. H. Tsai
Assistant Examiner—Hyun Nam
(74) Attorney, Agent, or Firm—Fitzpatrick, Cella, Harper & Scinto (57) ABSTRACT

A data output apparatus receives a first command from a first device, and receives a second command from a second device. The apparatus (a) sets an output terminal to a locked state where a data format thereof is locked to a data format indicated by the first command and where the terminal cannot output video data whose data format is different, if the first command is received while the terminal is being set to an unlocked state, (b) determines whether a data format indicated by the second command is the same as the data format of the terminal, if the second command is received while the terminal is being set to the locked state, and (c) transmits a response for informing the second device that the second command is accepted, if the data format indicated by the second command is the same as the data format of the terminal.

4 Claims, 7 Drawing Sheets

FOREIGN PATENT DOCUMENTS

| | | |
|---|---|---|
| JP | 2003-209552 | 7/2003 |
| JP | 2003-242053 | 8/2003 |

OTHER PUBLICATIONS

IEC 61883-1, Consumer audio/video equipment—Digital Interface—Part 1 General, First edition, Feb. 1998, pp. 1-83.

Universal Serial Bus Specification Revision 2.0, Apr. 27, 2000, pp. i-622 (in two parts).

TA Document 2001012, AV/C Digital Interface Command Set General Specification Version 4.1, 1394 Trade Association, Dec. 11, 2001, pp. 1-108.

IEEE Std 1394-1995, IEEE Standard for a High Performance Serial Bus, The Institute of Electrical and Electronics Engineers, Inc., 1996, pp. i-45.

IEEE Std 1394a-2000, IEEE Standard for a High Performance Serial Bus-Amendment 1, The Institute of Electrical and Electronics Engineers, Inc., 2000, pp. i-23.

IEC 61883-2: Consumer audio/video equipment-Digital interface-Part 2: SD-DVCR data transmission, first edition, Feb. 1998, pp. 1-17.

IEC 61883-4: Consumer audio/video equipment-Digital interface-Part 4: MPEG2-TS data transmission, first edition, Feb. 1998, pp. 1-23.

* cited by examiner

FIG. 3

| 301 | 302 | 303 |
|---|---|---|
| DV DATA (INCLUDING SD VIDEO DATA) | MPEG-2 DATA (INCLUDING HD VIDEO DATA) | DV DATA (INCLUDING SD VIDEO DATA) |

FIG. 4

| | MSB | | | | | | LSB |
|---|---|---|---|---|---|---|---|
| OPCODE | \multicolumn{7}{c}{OUTPUT PLUG SIGNAL FORMAT LOCK} |
| OPERAND[0] | \multicolumn{7}{c}{LOCK} |
| OPERAND[1] | FORMAT | \multicolumn{6}{c}{PLUG NUMBER} |

FIG. 5

| | MSB | | | | | LSB |
|---|---|---|---|---|---|---|
| OPCODE | \multicolumn{6}{c}{INPUT PLUG SIGNAL FORMAT LOCK} |
| OPERAND[0] | \multicolumn{6}{c}{LOCK} |
| OPERAND[1] | FORMAT | \multicolumn{5}{c}{PLUG NUMBER} |

|  |  | STATE OF PLUG | CURRENT DATA FORMAT | NODE ID | EUI-64 |
|---|---|---|---|---|---|
| oPCR INFORMATION | oPCR[0] | LOCKED STATE | DV | 0×0000 | 0×AAAAAAAAAAAAAAAA |
|  | oPCR[1] | UNLOCKED STATE | DV | --- | --- |
|  | ⋮ | ⋮ | ⋮ | ⋮ | ⋮ |
|  | oPCR[30] | UNLOCKED STATE | DV | --- | --- |
| iPCR INFORMATION | iPCR[0] | LOCKED STATE | MPEG | 0×0001 | 0×BBBBBBBBBBBBBBBB |
|  | iPCR[1] | UNLOCKED STATE | DV | --- | --- |
|  | ⋮ | ⋮ | ⋮ | ⋮ | ⋮ |
|  | iPCR[30] | UNLOCKED STATE | DV | --- | --- |

DATA OUTPUT APPARATUS THAT LOCKS AND UNLOCKS DATA FORMAT

BACKGROUND OF THE INVENTION

1. Field of the Invention

The present invention relates to a data output apparatus having output means of outputting a plurality of types of data, a data input apparatus having input means of inputting a plurality of types of data, and the like.

2. Related Background Art

Currently, there has been proposed a recording and reproducing apparatus having a function of recording a plurality of types of stream data on a magnetic tape and a function of reproducing a plurality of types of stream data from a magnetic tape (see, for example, Document 1 described below). In the Patent Document 1, there has been proposed a recording and reproducing apparatus, which records a SD (Standard Definition) video data or a HD (High Definition) video data on a magnetic tape. Here, the SD video data is a vide data which conforms to a DV system formulated by a HD Digital VCR Conference, and the HD video data is video data conformed to a MPEG-2 system.

Also currently, in the network interface of the recording and reproducing apparatus, there have been known IEEE 1394 standards (see Documents 2 and 3 described below), and USB standard (see Document 4 described below). Either of the IEEE 1394 standards and the USB standard is a standard regarding a high-speed serial bus. In particular, in the network interface (hereinafter referred to as IEEE 1394 interface) conformed to the IEEE 1394 standards, it is possible to control input and output of the stream data conformed to the DV system or the MPEG-2 system (see Documents 5, 6 and 7 described below). Hereinafter, the stream data (including audio and video data) conformed to the DV system is referred to as "DV data", and the stream data (including audio and video data) conformed to the MPEG-2 system is referred to as "MPEG-2 data".

Respective documents 1 to 7 referred to as described above are as follows.

1. Japanese Patent Application Laid-Open No. 2001-275076
2. IEEE Std 1394-1995, IEEE Standard for a High Performance Serial Bus, Institute of Electrical and Electronics Engineers, Inc.
3. IEEE Std 1394a-2000, IEEE Standard for a High Performance Serial Bus—Amendment 1, Institute of Electrical and Electronics Engineers, Inc.
4. Universal Serial Bus Specification Revision 2.0, Apr. 27, 2000
5. IEC 61883-1: Consumer audio/video equipment—Digital interface—Part 1: General
6. IEC 61883-2: Consumer audio/video equipment—Digital interface—Part 2: SD-DVCR data transmission
7. IEC 61883-4: Consumer audio/video equipment—Digital interface—Part 4: MPEG2-TS data transmission In the case of a recording and reproducing apparatus having an IEEE 1394 interface and conforming to the IEC 61883-1, IEC 61883-2 and IEC 61883-4, it is possible to continuously output DV data and MPEG-2 data to the outside through an oPCR defined by the IEC 61883-1, and also continuously receive DV data and MPEG-2 data from the outside through an iPCR defined by the IEC 61883-1.

Depending on a control apparatus for remote-controlling the above described recording and reproducing apparatus, there are some cases where it would be better to lock a data format of the stream data outputted from the oPCR of the recording and reproducing apparatus to a predetermined data format. For example, when the control apparatus can process the DV data, but cannot process the MPEG-2 data, a data format of the stream data outputted from the oPCR would be better to be locked to the DV system.

However, at present, there has been no command clearly defined, which requests to change an oPCR state to a locked state (a state locked to a predetermined data format (either of the DV system, the MPEG-2 system, and the like)). There has been also no command clearly defined, which requests to change the oPCR state to an unlocked state (state in which a locked state is released). Consequently, from the control apparatus, the oPCR state cannot be changed into the locked state or the unlocked state. Further, in case there exist a plurality of control apparatuses, it is also not clearly defined as to which command from the control apparatuses should be given a priority. These problems also hold true for the command which requests that the data format of the stream data inputted to the iPCR is locked to a predetermined data format.

Further, these problems are also problems occurable also in the recording and reproducing apparatus having output means (including not only a logical output terminal such as the oPCR, but also a physical output terminal) which is equivalent to the oPCR defined by the IEC 61883-1, and still also problems occurable in the recording and reproducing apparatus having input means (including not only a logical input terminal such as the iPCR, but also a physical input terminal) which is equivalent to the iPCR defined by the IEC 61883-1.

SUMMARY OF THE INVENTION

An object of the present invention is to overcome the above-described drawbacks.

Further, an object of the present invention is, for example, to be able to change a state of the output means (for example, the oPCR defined by the IEC 61883-1) or the input means (for example, the iPCR defined by the IEC 61883-1) to a locked state (state locked to a predetermined data format) or an unlocked state (state in which a locked stated is released) according to commands from a control apparatus.

Further, an object of the present invention is, for example, not to set the output means into an unlocked state or a state locked to another data format according to the command from other than the control apparatus which has already set the output means (for example, the oPCR defined by the IEC 61883-1) into a locked state previously.

Further, an object of the present invention is, for example, not to set the input means into an unlocked state or a state locked to another data format according to the command from other than the control apparatus which has already set the input means (for example, the iPCR defined by the IEC 61883-1) into a locked state previously.

According to an aspect of the present invention, a data output apparatus of the present invention comprises: a receiving unit adapted to receive a command which requests that output means is set into a state locked to a predetermined data format; a setting unit adapted to set the output means into a state locked to the predetermined data format in accordance with the command; and a storing unit adapted to store information for identifying a control apparatus which transmits the command, wherein once the output means is set into a state locked to the predetermined data format in accordance with the command, the output means is not set into a state not locked to the predetermined data format in accordance with a command from other than the control apparatus.

According to another aspect of the present invention, a data output apparatus of the present invention comprises a receiving unit adapted to receive a command which requests that output means is set into a state locked to a predetermined data format; a setting unit adapted to set the output means into a state locked to the predetermined data format in accordance with the command; and a storing unit adapted to store information for identifying a control apparatus which transmits the command, wherein once the output means is set into a state locked to the predetermined data format in accordance with the command, the output means is not set into a state locked to a data format other than the predetermined data format in accordance with a command from other than the control apparatus.

According to still another aspect of the present invention, a data input apparatus of the present invention comprises comprising: a receiving unit adapted to receive a command which requests that input means is set into a state locked to a predetermined data format; a setting unit adapted to set the input means into a state locked to the predetermined data format in accordance with the command, and a storing unit adapted to store information for identifying a control apparatus which transmits the command, wherein once the input means is set into a state locked to the predetermined data format in accordance with the command, the input means is not set into a state not locked to the predetermined data format in accordance with a command from other than the control apparatus.

According to still another aspect of the present invention, a data input apparatus of the present invention comprises: a receiving unit adapted to receive a command which requests that input means is set into a state locked to a predetermined data format; a setting unit adapted to set the input means into a state locked to the predetermined data format according to the command; and a storing unit adapted to store information for identifying a control apparatus which transmits the command; wherein once the input means is set into a state locked to the predetermined data format in accordance with the command, the input means is not set to a state locked to a data format other than the predetermined data format in accordance with the command from other than the control apparatus.

Other features and advantages of the invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE PREFERRED EMBODIMENTS

Hereinafter, preferable embodiments of the present invention will be described with reference to the accompanying drawings.

First Embodiment

First, main components of a control system according to a first embodiment will be described with reference to FIG. 1.

Figure 1:
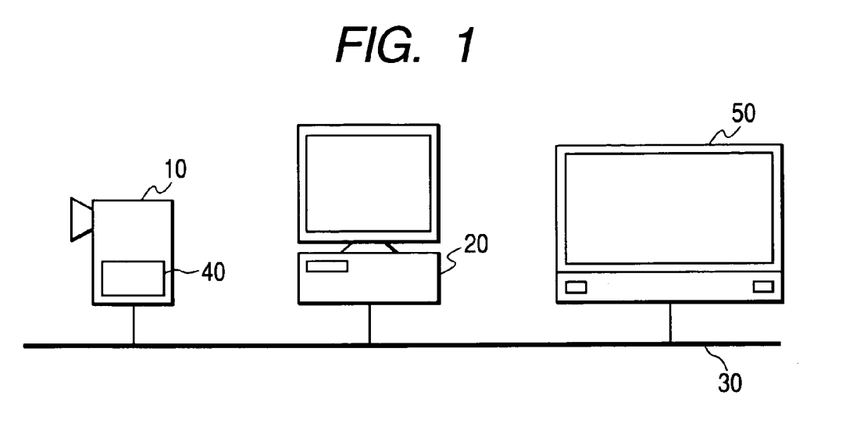
FIG. 1 is a view to explain main components of a control system according to a preferable embodiment of the present invention.

In FIG. 1, reference numeral 10 denotes a recording and reproducing apparatus, which has a function to receive a plurality of types of stream data from the outside and record them on a recording medium, and a function to reproduce a plurality of types of stream data from the recording medium and output them to the outside.

In the present embodiment, a case will be described, where the recording and reproducing apparatus 10 is an apparatus arranged to handle the above described DV data and MPEG-2 data. Further, in the present embodiment, a case will be described, where the DV data includes SD (Standard Definition) video data, and the MPEG-2 data includes HD (High Definition) video data having a higher resolution (the number of pixels) than the SD video data. Further, in the present embodiment, though a case will be described, where the recording and reproducing apparatus 10 is a digital video camera (hereinafter referred to as DVC), the recording and reproducing apparatus 10 may be an apparatus otherwise, such as a digital camera, a mobile phone with camera, a digital video recorder, and the like. The recording and reproducing apparatus can be regarded both as a data output apparatus for outputting the stream data to the outside, and as a data input apparatus for inputting the stream data from the outside.

Reference numeral 20 denotes a first control apparatus having a program of remote-controlling the recording and reproducing apparatus 10. In particular, the first control apparatus 20 has a program which controls states of the output terminal (oPCR defined by the IEC 61883-1) and the input terminal (iPCR defined by the IEC 61883-1) of the DVC 10 by using an OUTPUT PLUG SIGNAL FORMAT LOCK command and an INPUT PLUG SIGNAL FORMAT LOCK command to be described later. In the present embodiment, a case will be described, where the first control apparatus 20 is a personal computer (hereinafter referred to as PC).

Reference numeral 50 denotes a second control apparatus having a program of remote-controlling the recording and reproducing apparatus 10. The second control apparatus 50 also, similarly to the first control apparatus 20, has a program which controls states of the output terminal (oPCR defined by the IEC 61883-1) and the input terminal (iPCR defined by the IEC 61883-1) of the DVC 10 by using the OUTPUT PLUG SIGNAL FORMAT LOCK command and the INPUT PLUG SIGNAL FORMAT LOCK command to be described later. In the present embodiment, a case will be described, where the second control apparatus 50 is a display device (hereinafter, referred to as DTV) with a digital television tuner.

Reference numeral 30 is a transmission medium, which connects the DVC 10, the PC 20, and the DTV 50. In the present embodiment, a case will be described, where the transmission medium 30 is an IEEE 1394 serial bus. The IEEE 1394 serial bus is a serial bus conformed to the above described IEEE 1394 standards.

Reference numeral 40 is a recording medium attachable to the DVC 10. In the present embodiment, though a case will be described, where the recording medium 40 is a magnetic tape, the recording medium 40 may be a recording medium otherwise, for example, such as a hard disk device, an optical disk, a magnetic disk, and the like.

Each of the DVC 10, the PC 20 and the DTV 50 has the above described IEEE 1394 interface, and can perform a communication with each other through the IEEE 1394 serial bus 30.

Each of the PC 20 and the DTV 50 operates as a controller to control the DVC 10 (target) by using a FCP (function Control Protocol) defined by the IEC 61883-1 and an AV/C command (reference Document: TA Document 2001012, AV/C Digital Interface Command Set General Specification 4.1, Dec. 11, 2001).

Next, the main components of the DVC 10 will be described with reference to FIG. 2.

Figure 2:
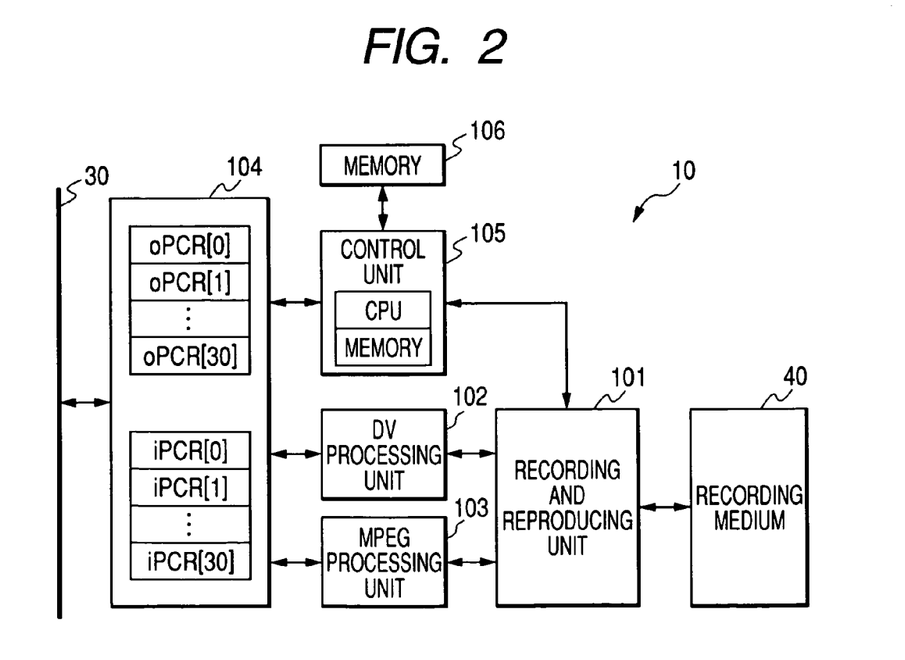
FIG. 2 is a block diagram to explain main components of a recording and reproducing apparatus (for example, DVC) according to the preferable embodiment of the present invention.

In FIG. 2, reference numeral 101 denotes a recording and reproducing unit, which has a function to reproduce the stream data (DV data or MPEG-2 data) recorded on the recording medium 40, and a function to record the inputted stream data (DV data or MPEG-2 data) on the recording medium 40. Reference numeral 102 denotes a DV processing unit of processing the DV data.

Reference numeral 103 is a MPEG processing unit of processing the MPEG-2 data. Reference numeral 104 denotes an IEEE 1394 interface unit, which can communicate with the PC 20 and the DTV 50. The IEEE 1394 interface unit 104 has 31 pieces of the oPCR (output plug control resistor) and 31 pieces of the iPCR (input plug control resistor). The oPCR is a logical output terminal defined by the IEC 61883-1, and the iPCR is a logical input terminal defined by the IEC 61883-1. Reference numeral 105 denotes a control unit to control the operation of the DVC 10, which comprises a CPU (Central Processing Unit) and a memory which stores a program including a program of controlling the process described in FIGS. 6, 7, 9, and 10, to be executed by the CPU. Reference numeral 106 is a memory storing a plug control table. The plug control table can be registered with the information regarding all the oPCR and iPCR. Hereinafter, the information regarding the oPCR is referred to as "oPCR information" and the information regarding the iPCR is referred to as "IPCR information". One example of the plug control table is shown in FIG. 8.

Figure 8:
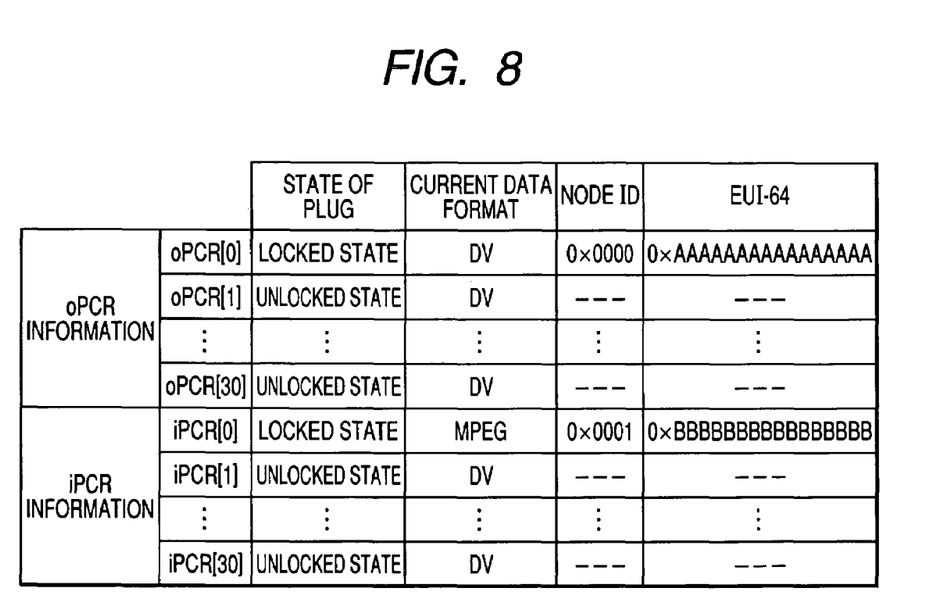
FIG. 8 is a view to show one example of the constitution of a plug control table.

The "State of Plug" shown in FIG. 8 is a column in which a data showing whether or not the oPCR or the iPCR is set into a locked state is registered.

The "Current Data Format" shown in FIG. 8 is a column in which a data showing the current data format of the oPCR and the iPCR is registered. The current data format is a data format currently set in the oPCR and iPCR. The control unit 105 changes the current data format of the oPCR and the iPCR in an unlocked state to the MPEG-2 system in case the MPEG-2 data is reproduced from the recording medium 40. Further, the control unit 105 changes the current data format of the oPCR and the iPCR in an unlocked state to the DV system in case the DV data is reproduced from the recording medium 40. Further, the control unit 105 changes the current data format of the oPCR or the iPCR in a locked state in accordance with the OUTPUT PLUG SIGNAL FORMAT LOCK command or the INPUT PLUG SIGNAL FORMAT LOCK command from the controller (PC 20 or DTV 50) which sets the oPCR or iPCR into a locked state.

The "Node ID" shown in FIG. 8 is a column in which a data showing a node ID (equivalent to the network address) of the controller, which sets the oPCR or the iPCR into a locked state, is registered. Needless to mention, the node ID can be obtained from the asynchronous packet which transmits the OUTPUT PLUG SIGNAL FORMAT LOCK command or the INPUT PLUG SIGNAL FORMAT LOCK command.

The "EUI-64" shown in FIG. 8 is a column in which a data showing the EUI-64 which is an ID peculiar to the controller, which sets the oPCR or the iPCR into a locked state, is registered. The node ID has a possibility of being changed into another node ID in case a bus rest defined by the IEEE 1394 standards occurs. In the meantime, the EUI-64 remains unchanged. Hence, the control unit 105, every time the bus reset occurs, detects the node IDs corresponding to all the EUI-64 registered in the plug control table, and performs a process of re-registering the detected node IDs in the plug control table. At this time, the control table 105 deletes the EUI-64, in which the corresponding note ID does not exist, from the plug control table, and at the same time, changes the oPCR or the iPCR corresponding to that EUI-64 into an unlocked state. By performing this process, the control unit 105, even after the bust rest occurs, can adequately control the oPCR and iPCR. The bus rest includes a process for initializing the network constitution, and a process of automatically giving a node ID to each node within the network.

The control unit 105, when a power source switch of the DVC 10 is turned ON, sets states of all the oPCR and iPCR into unlocked states, and sets the current data formats of all the oPCR and iPCR into the DV system (or MPEG system), and deletes the node ID and the EUI-64 registered in all the oPCR and iPCR from the plug control table. The initial value of the current data format can be also changed by the user. The control unit 105, in case the oPCR or the iPCR is not used for a definite period of time after the oPCR or the iPCR is set into a locked state, sets the oPCR or the iPCR into an unlocked state, and deletes the node ID and the EUI-64 registered in the oPCR or the iPCR from the plug control table.

In case the DV data reproduced from the recording medium 40 is transmitted to the PC 20 or the DTV 50, the DVC 10 transmits the DV data to the PC 20 or the DTV 50 through the DV processing unit 102 and at least one oPCR. Further, in case the MPEG-2 data reproduced from the recording medium 40 is transmitted to the PC 20 or the DTV 50, the DVC 10 transmits the MPEG-2 data to the PC 20 or the DTV 50 through the MPEG processing unit 103 and at least one oPCR.

In case the DV data transmitted from the PC 20 or the DTV 50 is recorded on the recording medium 40, the DVC 10 records the DV data on the recording medium 40 through at least one iPCR, and the DV processing unit 102. Further, in case the MPEG-2 data transmitted from the PC 20 or the DTV 50 is recorded on the recording medium 40, the DVC 10 records the MPEG-2 data on the recording medium 40 through at least one iPCR and the MPEG processing unit 103.

Figure 3:
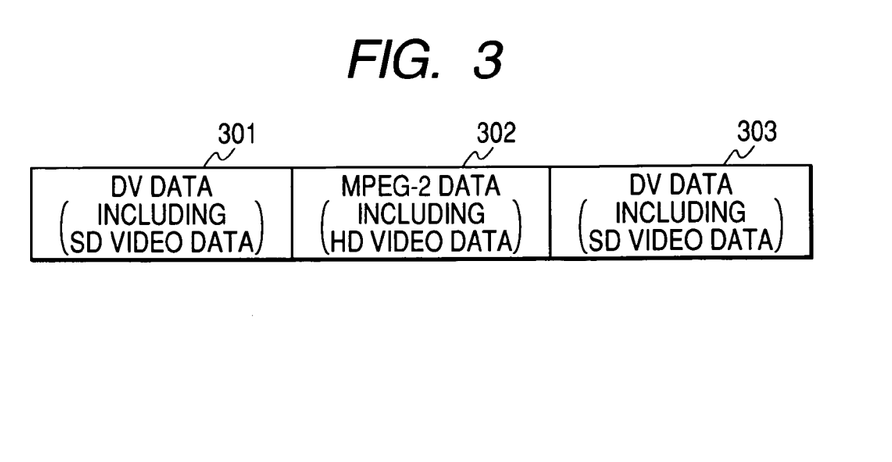
FIG. 3 is a view to show one example of a plurality of stream data recorded on a recording medium (for example, a magnetic tape)

Next, with reference to FIG. 3 one example of a plurality of stream data recorded on the recording medium 40 is described. The recording medium 40, as shown in FIG. 3, is recorded with the stream data conformed to a plurality of data formats.

In FIG. 3, reference numerals 301 and 303, similarly to the DV data, denote the stream data (including audio and video data) conformed to the DV system. Reference numeral 302, similarly to the MPEG-2 data, denotes the stream data (including audio and video data) conformed to the MPEG-2 system. In the present embodiment, the DV data shall include the SD (Standard Definition) video data, and the MPEG-2 data shall include the HD (High definition) video data having a higher resolution (more pixels) than the SD video data.

Next, the constitutions of an OUTPUT PLUG SIGNAL FORMAT LOCK command and an INPUT PLUG SIGNAL FORMAT LOCK command used in the present embodiment will be described by using FIGS. 4 and 5.

In the present embodiment, a state in which one oPCR or iPCR is locked by at least one data format is referred to as "locked state", and a state in which one oPCR or iPCR is released from the locked state (in other words, a state not locked to either data format) is referred to as "unlocked state".

Further, a state in which one oPCR or iPCR is locked to the DV system is referred to as "DV locked state", and a state in which one oPCR or iPCR is locked to the MPEG-2 system is referred to as "MPEG locked state".

Further, an OUTPUT PLUG SIGNAL FORMAT LOCK command, which requests that one oPCR is set into the locked state, is referred to as "output lock command", and an OUTPUT PLUG SIGNAL FORMAT LOCK command, which requests that one oPCR is set into the unlocked state, is referred to as "output unlock command". Similarly, an INPUT PLUG SIGNAL FORMAT LOCK command, which requests that one oPCR is set into the locked state, is referred to as "input lock command", and an INPUT PLUG SIGNAL FORMAT LOCK command, which requests that one oPCR is set into the unlocked state, is referred to as "input unlock command".

Figure 4:
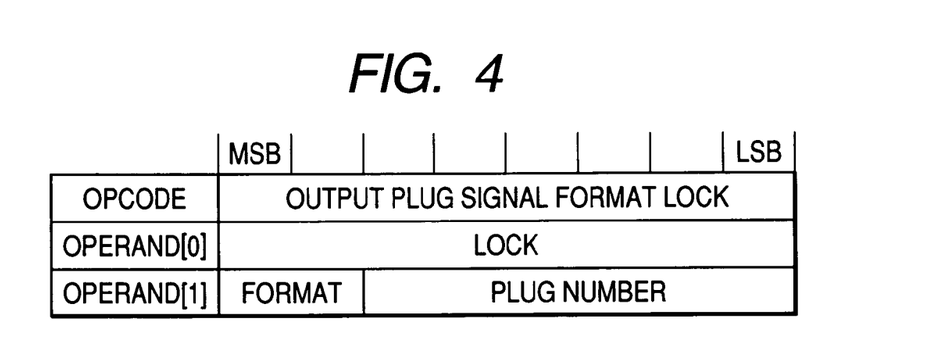
FIG. 4 is a view to explain a constitution of an OUTPUT PLUG SIGNAL FORMAT LOCK command.

FIG. 4 is a view to explain the constitution of the OUTPUT PLUG SIGNAL FORMAT LOCK command used in the present embodiment.

The OUTPUT PLUG SIGNAL FORMAT LOCK command is a command, which requests that the state of one or all the oPCRs are set into the locked state or the unlocked state.

The OUTPUT PLUG SIGNAL FORMAT LOCK command is a command conformed to the AV/C command defined by "TA Document 2001012, AV/C Digital Interface Command Set General Specification 4.1, Dec. 11, 2001", and is a command, which is transmitted to a target (DVC 10) from a controller (PC 20 or DTV 50) by a FCP (Function Control Protocol) defined by the IEC 61883-1. The OUTPUT PLUG SIGNAL FORMAT LOCK command is a command defined in the present embodiment, and is not a command defined in the "TA Document 2001012, AV/C Digital Interface Command Set General Specification 4.1, Dec. 11, 2001".

In FIG. 4, an OPCODE field (8 bits) is a field, which stores a code indicating the OUTPUT PLUG SIGNAL FORMAT LOCK command.

The lock field (8 bits) of an OPERAND [0] field is a field, which stores a value showing that the OUTPUT PLUG SIGNAL FORMAT LOCK command is an output lock command or an output unlock command. In case 0x70 is stored in the LOCK field, the DVC 10 determines that the OUTPUT PLUG SIGNAL FORMAT LOCK command is an output lock command. Further, in case 0x60 is stored in the LOCK field, the DVC 10 determines that the OUTPUT PLUG SIGNAL FORMAT LOCK command is an output unlock command.

The FORMAT field (2 bits) of an OPERAND [1] field is a field which is effective when the OUTPUT PLUG SIGNAL FORMAT LOCK command is an output lock command, and is a field, which stores a value showing the data format designated by the output lock command. In case the value of 1 is stored in the FORMAT field, the DVC 10 determines that the DV system is a data format designated by the output lock command. Further, in case the value of 2 is stored in the FORMAT field, the DVC 10 determines that the MPEG-2 system is a data format designated by the output lock command. Further, in case the value of 0 is stored in the FORMAT field, the DVC 10 determines that the current data format of the oPCR designated by the output lock command is a data format designated by the output lock command.

A PLUG NUMBER field (6 bites) of the OPERAND [1] field is a field, which stores a value showing a plug number of the oPCR to be set into the locked state or the unlocked state. In case the value of 1 is stored each bit of the PLUG NUMBER field, the DVC 10 determines that the oPCRs designated by the output lock command or the output unlock command is all the oPCRs. In case 0x00 is stored in the PLUG NUMBER field, the DVC 10 determines that the oPCR designated by the output lock command or the output unlock command is an oPCR of the number 0. Further, in case all 1 is stored in the PLUG NUMBER field, the DVC 10 determines that the oPCRs designated by the output lock command or the output unlock command is all the oPCRs.

The constitution of the OUTPUT PLUG SIGNAL FORMAT LOCK command is not limited to the constitution of FIG. 4. For example, in case there exists more than four types of data format which can be outputted from one oPCR, the constitution may be changed to a constitution in which an OPERAND [2] field is provided with a FORMAT field of 8 bits. Further, it may be constituted such that a code per se indicating the OUTPUT PLUG SIGNAL FORMAT LOCK designates a desired data format. In this case, a FORMAT field is not required.

Figure 5:
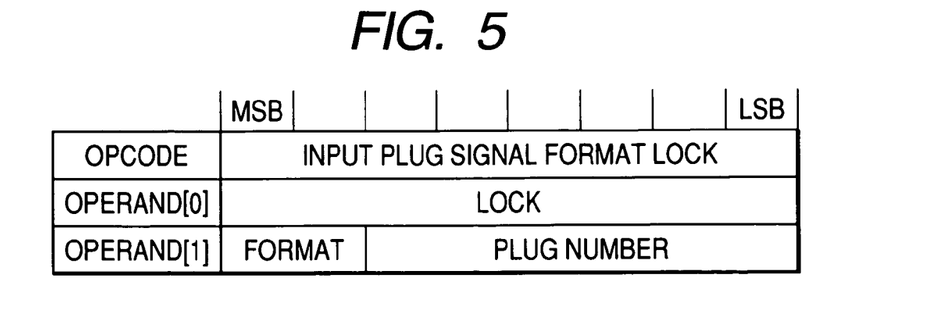
FIG. 5 is a view to explain a constitution of an INPUT PLUG SIGNAL FORMAT LOCK command.

FIG. 5 is a view to explain a constitution of the INPUT PLUG SIGNAL FORMAT LOCK command used in the present embodiment.

The INPUT PLUG SIGNAL FORMAT LOCK command is a command, which requests that the state of one or each of all the iPCRs is set into the locked state or the unlocked state.

Further, the INPUT PLUG SIGNAL FORMAT LOCK command, similarly to the OUTPUT PLUG SIGNAL FORMAT LOCK command, is a command conformed to the AV/C command defined by the "TA Document 2001012, AV/C Digital Interface Command Set General Specification 4.1, Dec. 11, 2001", and is a command, which is transmitted to a target (DVC 10) from a controller (PC 20 or DTV 50) by the FCP (Function Control Protocol) defined by the IEC 61883-1. The INPUT PLUG SIGNAL FORMAT LOCK command is a command defined in the present embodiment, and is not a command defined in the "TA Document 2001012, AV/C Digital Interface Command Set General Specification 4.1, Dec. 11, 2001".

In FIG. 5, an OPCODE field (8 bits) is a field, which stores a code indicating the INPUT PLUG SIGNAL FORMAT LOCK command.

The LOCK field (8 bits) of an OPERAND [0] field is a field, which stores a value showing that the INPUT PLUG SIGNAL FORMAT LOCK command is an input lock command or an input unlock command. In case 0x70 is stored in the LOCK field, the DVC 10 determines that the INPUT PLUG SIGNAL FORMAT LOCK command is an input lock command. Further, in case 0x60 is stored in the LOCK field, the DVC 10 determines that the INPUT PLUG SIGNAL FORMAT LOCK command is an input unlock command.

The FORMAT field (2 bits) of an OPERAND [1] field is effective when the INPUT PLUG SIGNAL FORMAT LOCK command is an input lock command, and is a field, which stores a value showing the data format designated by the input lock command. In case the value of 1 is stored in the FORMAT field, the DVC 10 determines that the DV system is a data format designated by the input lock command. Further, in case the value of 2 is stored in the FORMAT field, the DVC 10 determines that the MPEG-2 system is a data format designated by the input lock command. Further, in case the value of 0 is stored in the FORMAT field, the DVC 10 determines that the current data format of the iPCR designated by the input lock command is a data format designated by the input lock command.

A PLUG NUMBER field (6 bits) of the OPERAND [1] field is a field, which stores a value showing a plug number of the iPCR to be set into a locked state or an unlocked state. In case the value of all 1 is stored in the PLUG NUMBER field, the DVC 10 determines that the iPCRs designated by the input lock command or the input unlock command is all the iPCRs. In case 0x00 is stored in the PLUG NUMBER field, the DVC 10 determines that the iPCR designated by the input lock command or the input unlock command is an iPCR of the number 0. Further, in case the value of all 1 is stored in the PLUG NUMBER field, the DVC 10 determines that the iPCRs designated by the input lock command or the input unlock command is all the iPCRs.

The constitution of the INPUT PLUG SIGNAL FORMAT LOCK command is not limited to the constitution of FIG. 5. For example, in case there exist more than four types of data formats which can be inputted from one iPCR, the constitution may be changed to a constitution in which an OPERAND [2] field is provided with a FORMAT field of 8 bits. Further, it may be changed to a constitution in which a code per se indicating the INPUT PLUG SIGNAL FORMAT LOCK designates a desired data format. In this case, a FORMAT field is not required.

Figure 6:
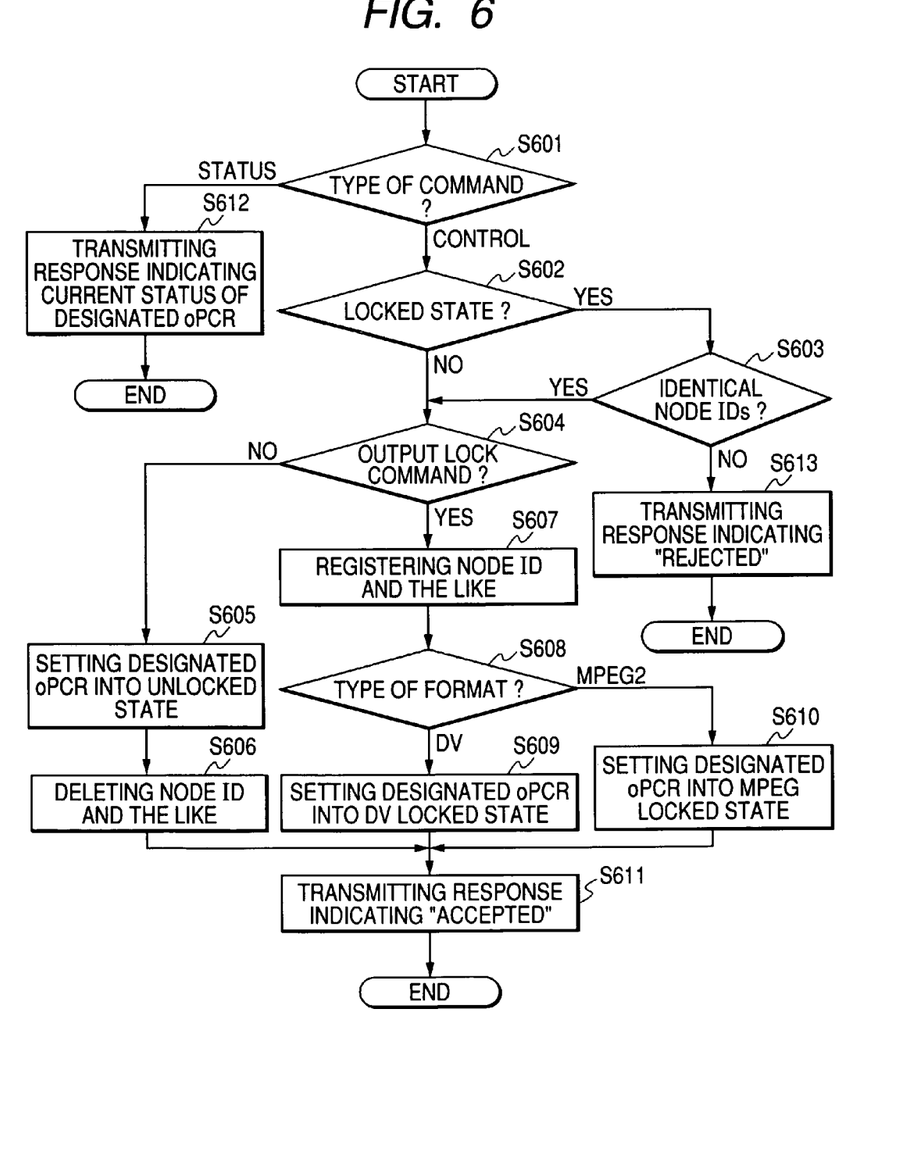
FIG. 6 is a flowchart to explain a process executed by the recording and reproducing apparatus (for example, DVC) in a first embodiment every time an OUTPUT PLUG SIGNAL FORMAT LOCK command is received.

Next, a process executed by the DVC 10 every time the OUTPUT PLUG SIGNAL FORMAT LOCK command is received will be described with reference to the flowchart of FIG. 6. The process described with reference to the flowchart of FIG. 6 is a process controlled by the control unit 105 according to a predetermined program.

In step S601, the control unit 105 determines the type (command type) of the OUTPUT PLUG SIGNAL FORMAT LOCK command transmitted from the controller (PC 20 or the DTV 50) to the DVC 10. The classification of the OUTPUT PLUG SIGNAL FORMAT LOCK command can be determined by the C type defined by the "TA Document 2001012, AV/C Digital Interface Command Set General Specification 4.1, Dec. 11, 2001". In case the command type of the OUTPUT PLUG SIGNAL FORMAT LOCK command is a control (CONTROL), the process advances to step S602, and in case the command type of the OUTPUT PLUG SIGNAL FORMAT LOCK command is a status (STATUS), the process advances to step S612.

In step S602, the control unit 105 determines whether or not the oPCR designated by the OUTPUT PLUG SIGNAL FORMAT LOCK command is in a locked state by referring to the plug control table. Hereinafter, the oPCR designated by the OUTPUT PLUG SIGNAL FORMAT LOCK command is referred to as "designated oPCR". In case the designated oPCR is determined to be in a locked state, the process advances to step S603, and in case the designated oPCR is determined to be in an unlocked state, the process advances to step S604.

In step S603, the control unit 105, by referring to the plug control table, determines whether or not the node ID which is set to the designated oPCR and the node ID of the controller which transmits the OUTPUT PLUG SIGNAL FORMAT LOCK command are identical with each other. When the two node IDs are identical with each other, the control unit 105 determines that the controller which transmits the OUTPUT PLUG SIGNAL FORMAT LOCK command is the controller which sets the designated oPCR into a locked state, and the process advances to step S604. In the meantime, when the two node IDs are not identical with each other, the control unit 105 determines that the controller which transmits the OUTPUT PLUG SIGNAL FORMAT LOCK command is not the controller which sets the designated oPCR into a locked state, and the process advances to step S613.

In step S604, the control unit 105 determines whether or not the OUTPUT PLUG SIGNAL FORMAT LOCK command is an output lock command. In case the value of the LOCK field of the OUTPUT PLUG SIGNAL FORMAT LOCK command is "0x0001", the control unit 105 determines that its command is the output lock command. In case the OUTPUT PLUG SIGNAL FORMAT LOCK command is the output lock command, the process advances to step S607, and in the case the OUTPUT PLUG SIGNAL FORMAT LOCK command is an output unlock command, the process advances to step S605.

In step S605, the control unit 105 sets the designated oPCR into an unlocked state. Further, the control unit 105 registers the fact that the designated oPCR is set into an unlocked state in the plug control table. The designated oPCR set into an unlocked state can output the stream data of various data formats. That is, the designated oPCR set into an unlocked state can output the DV data as well as the MPEG-2 data.

In step S606, the control unit 105 deletes the node ID and the EUI-64 of the designated oPCR from the plug control table. The node ID and the EUI-64 of the designated oPCR, as described above, are the node ID and the EUI-64 of the controller which sets the designated oPCR into a locked state. By deleting the node ID and the EUI-64 of the designated oPCR from the plug control table, the designated oPCR is set into a state which has never been set into a locked state.

In step S607, the control unit 105 detects the node ID and the EUI-64 of the controller which transmits the output lock command, and register them in the plug control table.

In step S608, the control unit 105 determines the type (format type) of the data format designated by the OUTPUT PLUG SIGNAL FORMAT LOCK command. Here, in case 0 is stored in the FORMAT field, the control unit 105 determines that the current data format of the designated oPCR is a data format designated by the output lock command. In case the designated data format is the DV system, the process advances to step S609, and in case the designated data format is the MPEG format, the process advances to step S610.

In step S609, the control unit 105 sets the designated oPCR into a DV locked state. Further, the control unit 105 registers the fact that the designated oPCR is set into a DV locked state in the plug control table. In case the stream data outputted from the designated oPCR set into a DV locked state is the stream data (for example, MPEG-2 data) other than the DV data, the IEEE 1394 interface unit 104 outputs the isochronous packet including only a CIP header showing that it is the DV system, to the IEEE 1394 serial bus 30. As for the constitution of the CIP header, since the detail thereof is described in the IEC 61883-1, IEC 61883-2, IEC 61883-3, IEC 61883-4 and IEC 61883-5, the explanation thereof will be omitted.

In step S610, the control unit 105 sets the designated oPCR into a MPEG locked state. Further, the control unit 105 registers the fact that the designated oPCR is set into a MPEG locked state in the plug control table. In case the stream data outputted from the designated oPCR set into a MPEG locked state is a steam data (for example, DV data) other than the MPEG-2 data, the IEEE 1394 interface unit 104 outputs the isochronous packet including only the CIP header only which shows that it is the MPEG-2 system, to the IEEE 1394 serial bus 30.

In step S611, the control unit 105 transmits an ACCEPTED response to the controller which transmits the OUTPUT PLUG SIGNAL FORMAT LOCK command. The ACCEPTED response is a response indicating that the OUTPUT PLUG SIGNAL FORMAT LOCK command has been normally accepted.

In step S612, the control unit 105 transmits a response indicating the current state of the designated oPCR to the controller, which transmits the command. In the present embodiment, this response shall include a data indicating whether or not the designated oPCR is in a locked state. This response can be constituted so as to include the node ID of the controller which sets the designated oPCR into a locked state and/or the EUI-64 which is an identifier peculiar to the controller. In this case, the controller which receives this response has an advantage of being able to specify by which controller the designated oPCR is set into a locked state.

In step S613, the control unit 105 transmits a REJECTED response to the controller, which transmits the OUTPUT PLUG SIGNAL FORMAT LOCK command. That is, the control unit 105 refuses the output unlock command and the output lock command from other than the controller, which sets the designated oPCR into a locked state. The REJECTED response is a response indicating that the OUTPUT PLUG SIGNAL FORMAT LOCK command is refused.

In this way, according to the present embodiment, one oPCR can be set into a locked state or an unlocked state according to the OUTPUT PLUG SIGNAL FORMAT LOCK command transmitted from the controller (PC 10 or DTV 50).

Further, according to the present embodiment, since the output unlock command and the output lock command other than from the controller which sets the designated oPCR into a locked state can be refused, the designated oPCR can be prevented from being changed into an unlocked state by the output unlock command and the output lock command from other than the controller which sets the designated oPCR into the DV locked state. Of course, the designated oPCR can be prevented from being changed into another data format. That is, in the present embodiment, the OUTPUT PLUG SINGAL FORMAT LOCK command from the controller which changes earlier the designated oPCR into a locked state can be given priority.

The process described with reference to the flowchart of FIG. 6 is a process, which can be executed for every oPCR. Consequently, the DVC 10 can set each oPCR into an unlocked state, a DV locked state or a MPEG locked state according to the OUTPUT PLUG SIGNAL FORMAT LOCK command from the controller (PC 20 or DTV 50).

Figure 7:
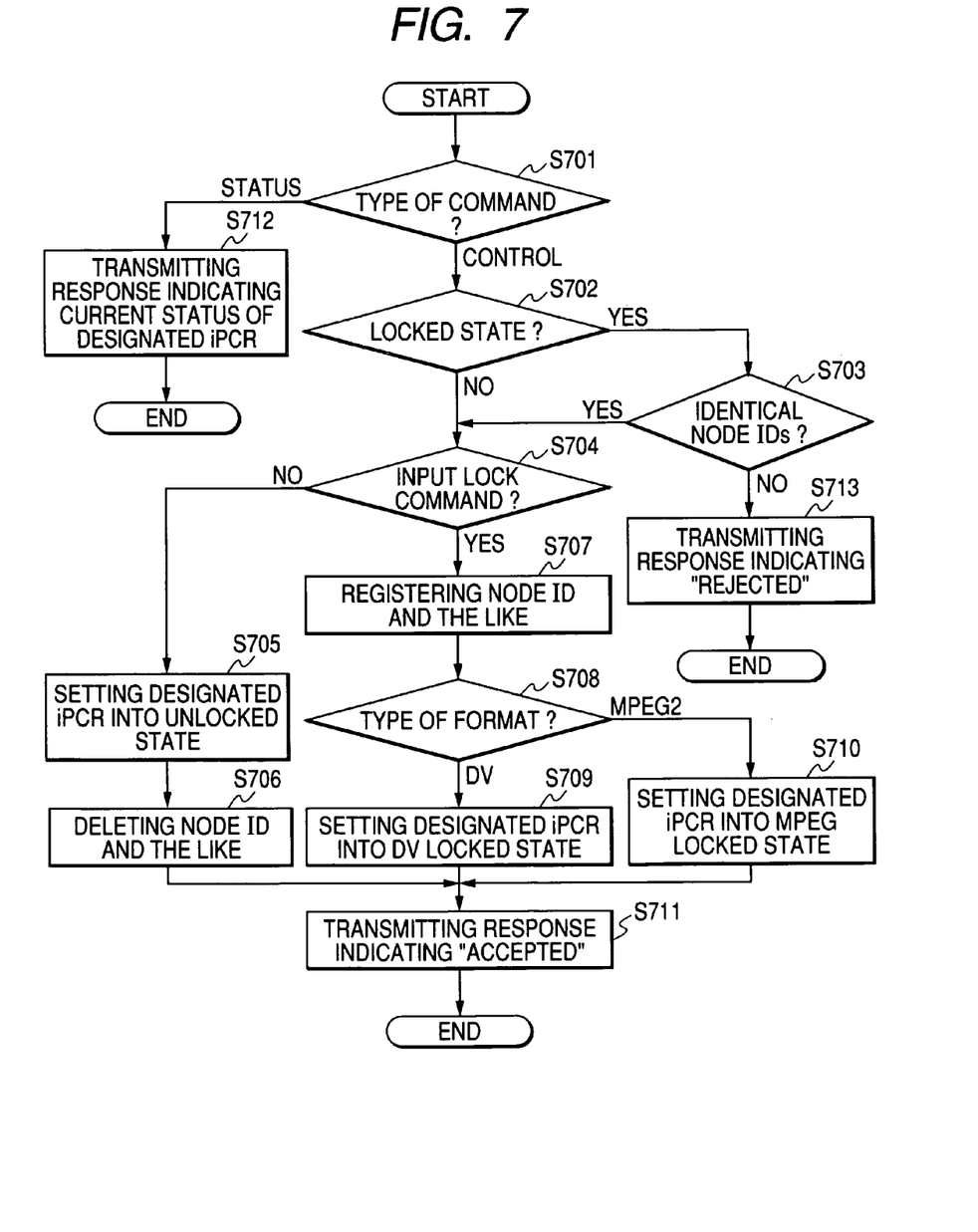
FIG. 7 is a flowchart to explain a process executed every time an INPUT PLUG SIGNAL FORMAT LOCK command is received by the recording and reproducing apparatus (for example, DVC) in the first embodiment.

Next, the process executed by the DVC 10 every time the INPUT PLUG SIGNAL FORMAT LOCK command is received will be described with reference to the flowchart of FIG. 7. The process described with reference to FIG. 7 is a process controlled by the control unit 105 according to a predetermined program.

In step S701, the control unit 105 determines the type (command type) of the INPUT PLUG SIGNAL FORMAT LOCK command transmitted from the controller (PC 20 or the DTV 50) to the DVC 10. The classification of the INPUT PLUG SIGNAL FORMAT LOCK command can be determined by the C type defined by the "TA Document 2001012, AV/C Digital Interface Command Set General Specification 4.1, Dec. 11, 2001". In case the command type of the INPUT PLUG SIGNAL FORMAT LOCK command is a control (CONTROL), the process advances to step S702, and in case the command type of the INPUT PLUG SIGNAL FORMAT LOCK command is a status (STATUS), the process advances to step S712.

In step S702, the control unit 105, by referring to the plug control table, determines whether or not the iPCR designated by the INPUT PLUG SIGNAL FORMAT LOCK command is in a locked state. Hereinafter, the iPCR designated by the INPUT PLUG SIGNAL FORMAT LOCK command is referred to as "designated iPCR". In case the designated iPCR is determined to be in a locked state, the process advances to step S703, and in case the designated iPCR is determined to be in an unlocked state, the process advances to step S704.

In step S703, the control unit 105, by referring to the plug control table, determines whether or not the node ID which is set to the designated iPCR and the node ID of the controller which transmits the INPUT PLUG SIGNAL FORMAT LOCK command are identical with each other. When the two node IDs are identical with each other, the control unit 105 determines that the controller which transmits the INPUT PLUG SIGNAL FORMAT LOCK command is the controller which sets the designated iPCR into a locked state, and the process advances to step S704. In the meantime, when the two node IDs are not identical with each other, the control unit 105 determines that the controller which transmits the INPUT PLUG SIGNAL FORMAT LOCK command is not the controller which sets the designated iPCR into a locked state, and the process advances to step S713.

In step S704, the control unit 105 determines whether or not the INPUT PLUG SIGNAL FORMAT LOCK command is an input lock command. In case the value of the LOCK field of the INPUT PLUG SIGNAL FORMAT LOCK command is "0x0001", the control unit 105 determines its command as the input lock command. In case the INPUT PLUG SIGNAL FORMAT LOCK command is the input lock command, the process advances to step S707, and in the case the INPUT PLUG SIGNAL FORMAT LOCK command is an input unlock command, the process advances to step S705.

In step S705, the control unit 105 sets the designated iPCR into an unlocked state. Further, the control unit 105 registers the fact that the designated iPCR is set into an unlocked state in the plug control table. The designated iPCR set into an unlocked state can input the stream data of various data formats. That is, the designated iPCR set into an unlocked state can input the DV data as well as the MPEG-2 data.

In step S706, the control unit 105 deletes the node ID and the EUI-64 of the designated iPCR from the plug control table. The node ID and the EUI-64 of the designated iPCR, as described above, are the node ID and the EUI-64 of the controller which sets the designated iPCR into a locked state. By deleting the node ID and the EUI-64 of the designated iPCR from the plug control table, the designated iPCR is set into a state which has never been set into a locked state.

In step S707, the control unit 105 detects the node ID and the EUI-64 of the controller which transmits the input lock command, and register them in the plug control table.

In step S708, the control unit 105 determines the type (format type) of the data format designated by the INPUT PLUG SIGNAL FORMAT LOCK command. Here, in case 0 is stored in the FORMAT field, the control unit 105 determines that the current data format of the designated iPCR is a data format designated by the input lock command. In case the designated data format is the DV system, the process advances to step S709, and in case the designated data format is the MPEG format, the process advances to step S710.

In step S709, the control unit 105 sets the designated iPCR into a DV locked state. Further, the control unit 105 registers the fact that the designated iPCR is set into a DV locked state in the plug control table.

In step S710, the control unit 105 sets the designated iPCR into a MPEG locked state. Further, the control unit 105 registers the fact that the designated iPCR has been set into a MPEG locked state in the plug control table.

In step S711, the control unit 105 transmits an ACCEPTED response to the controller which transmits the INPUT PLUG SIGNAL FORMAT LOCK command. The ACCEPTED response is a response indicating that the INPUT PLUG SIGNAL FORMAT LOCK command has been normally accepted.

In step S712, the control unit 105 transmits a response indicating the current state of the designated iPCR to the controller, which transmits the command. In the present embodiment, this response shall include a data indicating whether or not the designated iPCR is in a locked state. This response may be constituted so as to include the node ID of the controller which sets the designated iPCR into a locked state and/or the EUI-64 which is an identifier peculiar to the controller. In this case, the controller which receives this response has an advantage of being able to specify by which controller the designated iPCR is set into a locked state.

In step S713, the control unit 105 transmits a REJECTED response to the controller, which transmits the INPUT PLUG SIGNAL FORMAT LOCK command. That is, the control unit 105 refuses the input unlock command and the input lock command from other than the controller, which sets the designated iPCR into a locked state. The REJECTED response is a response indicating that the INPUT PLUG SIGNAL FORMAT LOCK command is refused.

In this way, according to the present embodiment, one iPCR may be set into a locked state or an unlocked state according to the INPUT PLUG SIGNAL FORMAT LOCK command transmitted from the controller (PC 10 or DTV 50).

Further, according to the present embodiment, since the input unlock command and the input lock command from other than the controller which sets the designated iPCR into a locked state can be refused, the designated iPCR can be prevented from being changed into a unlocked state by the input unlock command and the input lock command from other than the controller which sets the designated iPCR into a locked state. Of course, the designated iPCR can be also prevented from being changed into another data format. That is, in the present embodiment, the INPUT PLUG SINGAL FORMAT LOCK command from the controller which changes the designated iPCR into locked state earlier can be given priority.

The process described with reference to the flowchart of FIG. 7 is a process, which can be executed for every iPCR. Consequently, the DVC 10 can set each iPCR into a unlocked state, a DV locked state or a MPEG locked state according to the INPUT PLUG SIGNAL FORMAT LOCK command from the controller (PC 20 or DTV 50).

Second Embodiment

In the first embodiment, the embodiment which refuses the output lock command (or the input lock command) from other than the controller which sets the oPCR (or the iPCR) into a locked state has been described (see FIGS. 6 and 7).

In contrast to this, in a second embodiment, an embodiment will be described, in which a command is not refused in case a data format designated by that command is identical with a current data format of an oPCR (or iPCR) even when the command is an output lock command (or input lock command) from other than a controller which sets the oPCR (or iPCR) into a locked state. In the second embodiment, the portion different from the first embodiment will be described in detail.

First, a process executed every time a DVC 10 receives an OUPUT PLUG SIGNAL FORMAT LOCK command will be described with reference to the flowchart of FIG. 9. The process described with reference to the flowchart of FIG. 9 is a process controlled by a control unit 105 according to a predetermined program.

Figure 9:
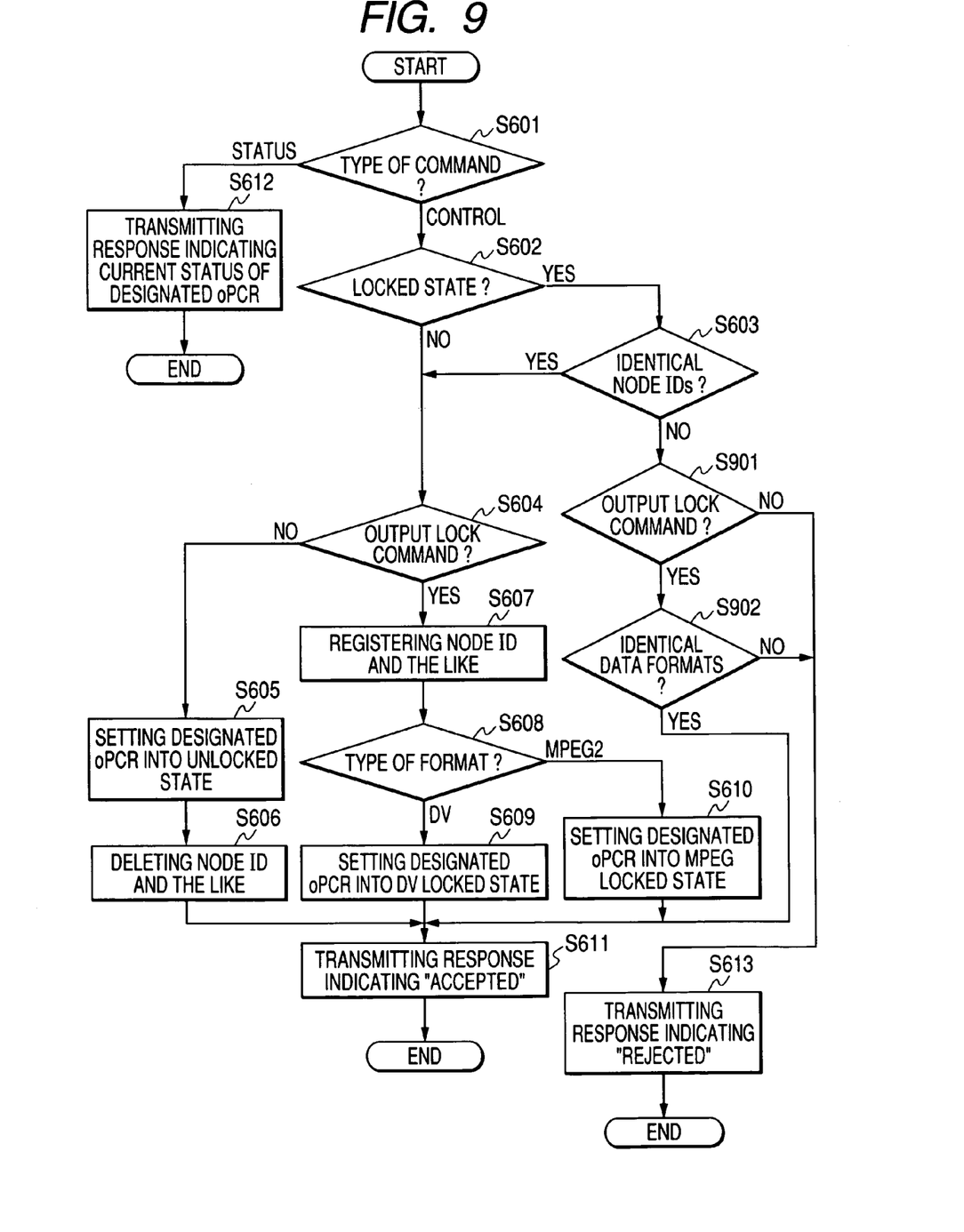
FIG. 9 is a flowchart to explain a process executed by the recording and reproducing apparatus (for example, DVC) in a second embodiment every time the OUTPUT PLUG SIGNAL FORMAT LOCK command is received.

Since the process from steps S601 to S613 of FIG. 9 is the same as the process from steps S601 to S613 of FIG. 6, the description thereof will be omitted. However, in step S603, in case two node IDs are not identical with each other, the process advances to step S901.

In step S901, the control unit 105, similarly to step S604, determines whether or not the OUTPUT PLUG SIGNAL FORMAT LOCK command is an output lock command. In case the OUTPUT PLUG SIGNAL FORMAT LOCK command is determined to be the output lock command, the process advances to step S902, and otherwise, advances to step S613.

In step S902, the control unit 105, by referring to the plug control table, determines whether or not the data format designated by the OUTPUT PLUG SIGNAL FORMAT LOCK command and the current data format of the designated oPCR are identical with each other. When determined to be identical with each other, the process advances to step S611, and otherwise, advances to step S613.

In this way, according to the present embodiment, in addition to the advantage obtained in the first embodiment, even when the command is an output lock command from other than the controller which sets the designated oPCR into a locked state, in case the data format designated by that command is identical with the current data format of the designated oPCR, that command can be allowed not to be refused. As a result, even when the controller is other than the controller in which the designated oPCR is set into a locked state, the stream data of a predetermined data format outputted from the designated oPCR can be inputted.

Next, the process executed by the DVC 10 every time the INPUT PLUG SIGNAL FORMAT LOCK command is received will be described with reference to the flowchart of FIG. 10. The process described with reference to the flowchart of FIG. 10 is a process controlled by the control unit 105 according to a predetermined program.

Figure 10:
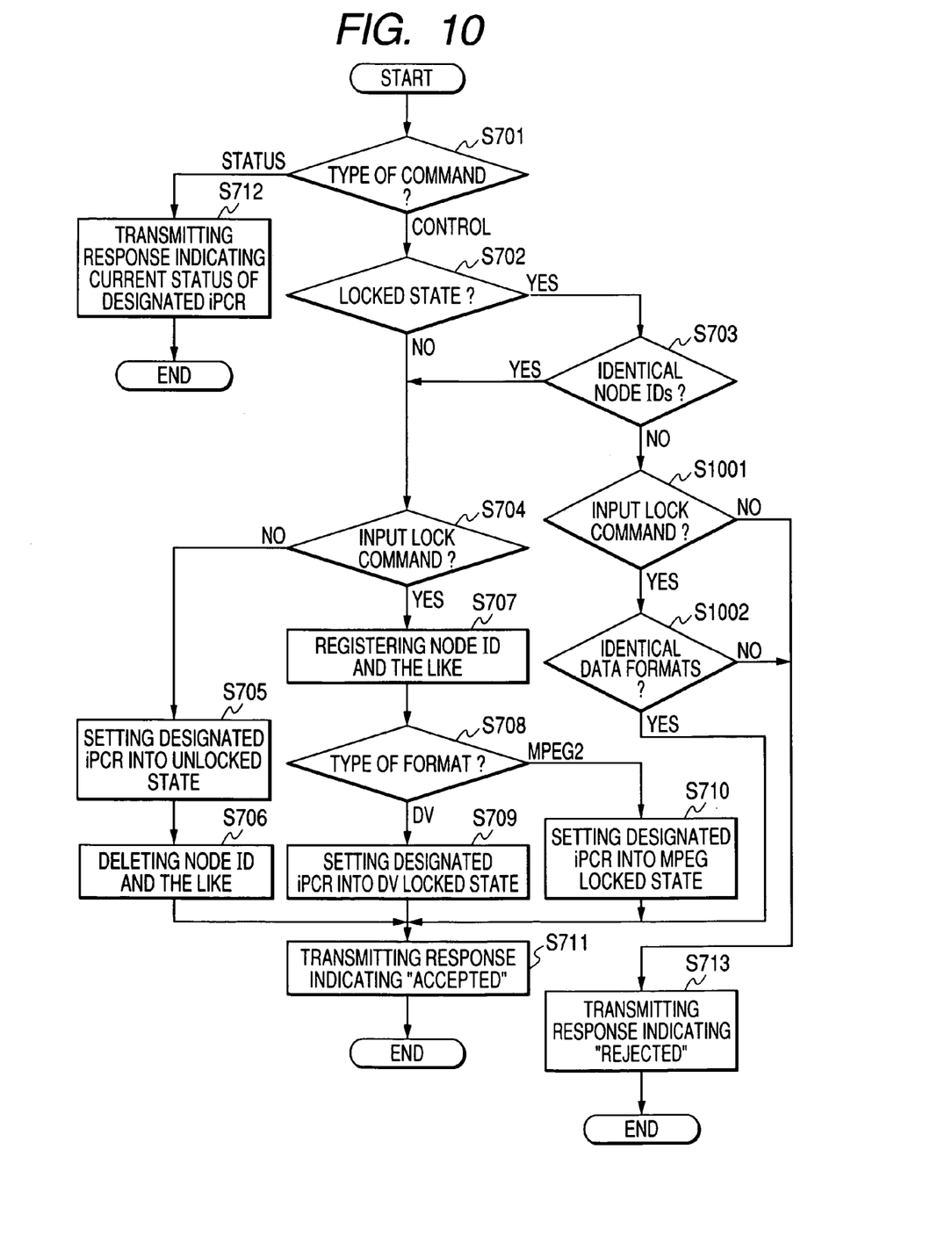
FIG. 10 is a flowchart to explain a process executed by the recording and reproducing apparatus (for example, DVC) in the second embodiment every time the OUTPUT PLUG SIGNAL FORMAT LOCK command is received.

Since the process from steps S701 to S713 of FIG. 10 is the same as the process from steps S701 to S713 of FIG. 7, the description thereof will be omitted. However, in step S703, in case two node IDs are not identical with each other, the process advances to step S1001.

In step S1001, the control unit 105, similarly to step S704, determines whether or not the INPUT PLUG SIGNAL FOR- MAT LOCK command is an input lock command. In case the INPUT PLUG SIGNAL FORMAT LOCK command is determined to be the input lock command, the process advances to step S1002, and otherwise, advances to step S713.

In step S1002, the control unit 105, by referring to the plug control table, determines whether or not the data format designated by the INPUT PLUG SIGNAL FORMAT LOCK command and the current data format of the designated iPCR are identical with each other. When determined to be identical with each other, the process advances to step S711, and otherwise, advances to step S713.

In this way, according to the present embodiment, in addition to the advantage obtained in the first embodiment, even when the command is an input lock command from other than the controller which sets the designated iPCR into a locked state, in case the data format designated by that command is identical with the current data format of the designated iPCR, that command can be allowed not to be refused. As a result, even when the controller is other than the controller in which the designated iPCR is set into a locked state, the stream data of a predetermined data format can be inputted to the designated iPCR.

Third Embodiment

Needless to mention, an object of the present invention can be achieved also by providing a recording medium storing a computer program of realizing the function of the above described embodiment to a system or an apparatus, and by reading and executing the computer program stored in the recording medium by a computer (or CPU and MPU) of the system or the apparatus.

In this case, the computer program itself read from the recording medium realizes the function of the above described embodiment, and the computer program itself and the recording medium storing the computer program constitutes the present invention.

As for the recording medium of providing the computer program, for example, a flexible disk, a hard disk, an optical disk, a magnetic optical disk, CD-ROM, CD-R, a magnetic tape, a nonvolatile memory card, ROM, and the like can be used.

Further, needless to mention, there is a case where, by executing the program read by the computer, not only the above described functions of the embodiment are realized, but there is also the case where, based on the designation of the computer program, a part or all the actual processes are performed by the OS (basic system or operating system) and the like operated on the computer, and by those processes, the above described functions of the embodiment are realized. This also constitutes the present invention.

Further, needless to mention, there is also the case where the computer program read from the recording medium is written in a memory provided for a feature extension unit connected to a feature extension board inserted into a computer or the computer, and after that, based on the designation of that computer program, the CPU and the like provided for the feature extension board or the feature extension unit performs a part or all the actual processes, and by those processes, the above described functions of the embodiment are realized.

Other Embodiments

The present invention is not limited to the above described embodiments, but can be applied also to various embodiments.

For example, though the above described embodiments are embodiments adopting a transmission medium conformed to the IEEE 1394 standards, the present invention can be also applied to an embodiment adopting the transmission medium conformed to a USB regulation and the like.

Further, while the above embodiments are embodiments adopting the oPCR or the iPCR defined by the IEC 61883-1, the present invention can be also applied to an embodiment adopting the output means equivalent to the oPCR including not only the logical output terminal such as the oPCR, but also the physical output terminal, and the input means equivalent to the iPCR including not only the logical input terminal such as the iPCR, but also the physical input terminal.

Further, while the above described embodiments are embodiments adopting the DV system and the MPEG-2 system, the present invention can be also applied to an embodiment adopting a data format other than the DV system or an embodiment adopting a data format other than the MPEG-2 system. The present invention, for example, can be also applied to the embodiment which adopts a MPEG-4 system or a Motion JPEG system instead of the MPEG-2 system.

Further, while the above described embodiments have described the embodiments adopting two data formats, the present invention can be also applied to an embodiment adopting three or more data formats. The present invention, for example, can be also applied to the embodiment which adopts the DV system, the MPEG-2 system and the MPEG-4 system (or Motion JPEG system).

The above-described preferable embodiments are merely exemplary of the present invention, and are not to be construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

This application claims priority from Japanese Patent Application No. 2004-050057 filed Feb. 25, 2004, which is hereby incorporated by reference herein.

What is claimed is:

1. A data output apparatus comprising:
an output terminal, wherein the output terminal is an oPCR (output plug control register) defined by the IEC 61883-1 standard;
a receiving unit that is configured to receive a first command from a first control device, and to receive a second command from a second control device different from the first control device; and
a control unit that (a) sets the output terminal to a locked state where a data format of the output terminal is locked to a data format indicated by the first command and where the output terminal cannot output video data whose data format is different from the data format indicated by the first command, if the receiving unit receives the first command from the first control device while the output terminal is being set to an unlocked state where the data format of the output terminal is not locked to one data format, (b) determines whether a data format indicated by the second command is the same as the data format of the output terminal, if the receiving unit receives the second command from the second control device while the output terminal is being set to the locked state, and (c) transmits a response for informing the second control device that the second command is accepted, if the data format indicated by the second command is the same as the data format of the output terminal.

2. The data output apparatus according to claim 1, wherein the output terminal is a logical output terminal.

3. A method of controlling a data output apparatus having an output terminal, the method comprising:

- a first receiving step of receiving a first command from a first control device;
- a second receiving step of receiving a second command from a second control device different from the first control device;
- a setting step of setting the output terminal to a locked state where a data format of the output terminal is locked to a data format indicated by the first command and where the output terminal cannot output video data whose data format is different from the data format indicated by the first command, if the first command is received from the first control device while the output terminal is being set to an unlocked state where the data format of the output terminal is not locked to one data format;
- a determining step of determining whether a data format indicated by the second command is the same as the data format of the output terminal, if the second command is received from the second control device while the output terminal is being set to the locked state; and
- a transmitting step of transmitting a response for informing the second control device that the second command is accepted, if the data format indicated by the second command is the same as the data format of the output terminal, wherein the output terminal is an oPCR (output plug control register) defined by the IEC 61883-1 standard.

4. The method according to claim 3, wherein the output terminal is a logical output terminal.

* * * * *